United States Patent [19]

Duncombe et al.

[11] Patent Number: 4,565,667
[45] Date of Patent: Jan. 21, 1986

[54] FAILED FUEL DETECTION APPARATUS

[75] Inventors: Edward Duncombe, Altrincham; Gordon Thatcher, Lymm, both of England

[73] Assignee: United Kingdom Atomic Energy Authority, London, England

[21] Appl. No.: 449,526

[22] Filed: Dec. 13, 1982

[30] Foreign Application Priority Data

Jan. 8, 1982 [GB] United Kingdom ............... 8200593

[51] Int. Cl.[4] ............................................. G21C 17/00
[52] U.S. Cl. ................................. 376/246; 376/251; 376/253
[58] Field of Search .................. 376/246, 251, 253; 417/50

[56] References Cited

U.S. PATENT DOCUMENTS

| 3,357,891 | 12/1967 | Wadmark | 376/253 |
|---|---|---|---|
| 3,733,249 | 5/1973 | Miller et al. | 376/253 |
| 3,885,890 | 5/1975 | Davidson | 417/50 |
| 3,947,318 | 3/1976 | Zhuchkov et al. | 376/253 |
| 4,177,015 | 12/1979 | Davidson | 417/50 |
| 4,207,922 | 6/1980 | Andrieux et al. | 376/253 |
| 4,332,639 | 6/1982 | Cosgrove et al. | 376/253 |
| 4,412,785 | 11/1983 | Roman | 417/50 |

FOREIGN PATENT DOCUMENTS

| 1156342 | 3/1966 | United Kingdom . |
| 1237536 | 6/1971 | United Kingdom . |
| 1147684 | 12/1975 | United Kingdom . |

Primary Examiner—Sal Cangialosi
Attorney, Agent, or Firm—William R. Hinds

[57] ABSTRACT

Failed fuel detection apparatus for nuclear reactors cooled by liquid metal has a pump (11) for impelling coolant metal along sampling pipes (10) to outlet points (10a) in the pipes. A rotary collector (15) is provided to scan the outlet points with a gap between the outlet points and the collector across which coolant in the sampling pipes can be impelled. The pump (11) is preferably of the helical annular linear induction type with the pipes passing through the annulus of the pump while being wetted internally and externally by liquid metal.

4 Claims, 1 Drawing Figure

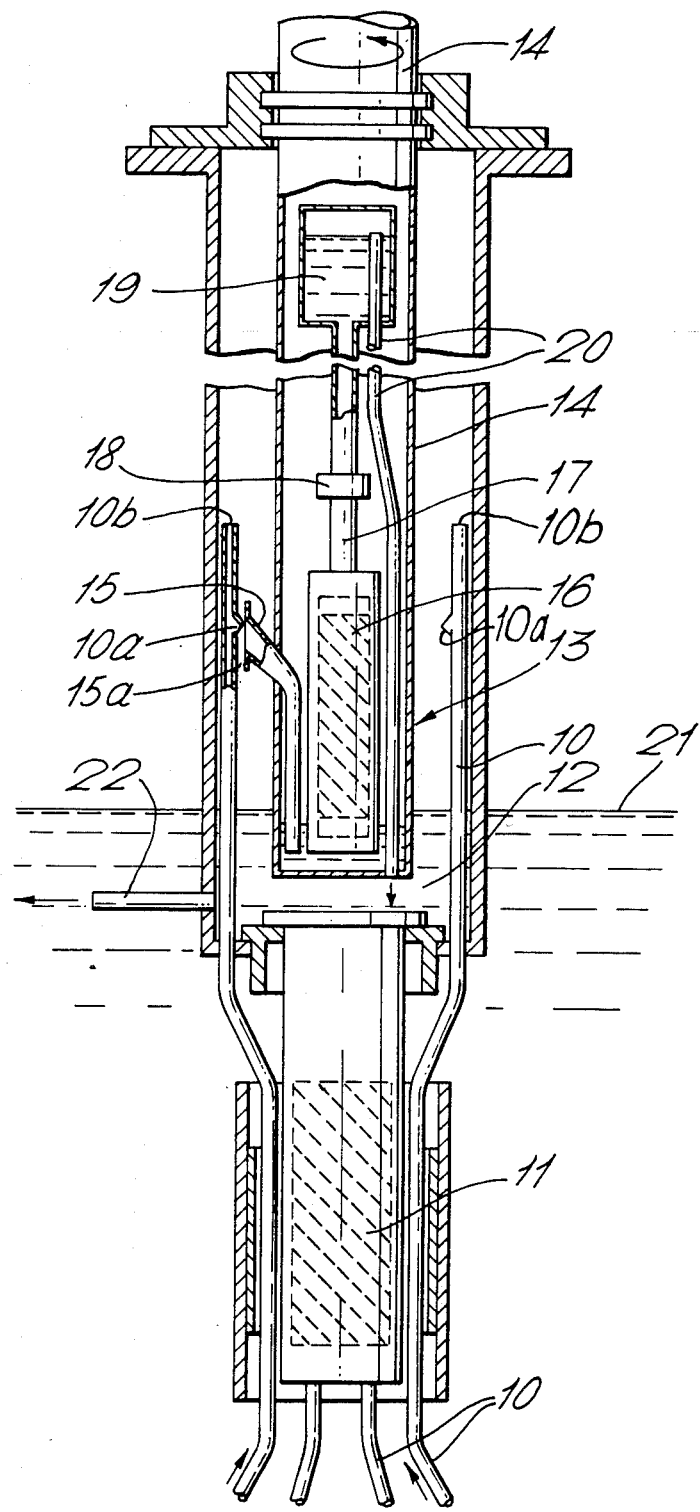

FAILED FUEL DETECTION APPARATUS

CROSS REFERENCE TO RELATED APPLICATIONS

Application Ser. No. 449,527 claiming priority from GB 82 00561 of Jan. 8, 1982 filed by the present applicants.

BACKGROUND OF THE INVENTION

The present invention relates to apparatus for testing for the occurrence of sheathing failures in fuel pins of a nuclear reactor cooled by liquid metal. Such apparatus is usually referred to as "Failed Fuel Detection Apparatus".

The general approach to this subject has been the use of coolant sampling pipes (one for each asembly of fuel) which are terminated at respective ports of a selection valve having a rotating selection arm with a rubbing seal which selects for measurement in sequence the coolant appearing at the ports in the valve. British patent specification No. 1,237,536 exemplifies this approach. A first pump is provided which draws coolant along the sampling pipes and a second pump is shown which draws coolant along the selection arm to delayed neutron counters.

However the rubbing seal is a point of weakness. Its failure could result in failure of the sampling system which would be difficult to replace.

FEATURES AND ASPECTS OF THE INVENTION

The present invention provides a construction which avoids this problem, namely, failed fuel detection apparatus of the kind having liquid coolant sampling pipes which are selected in turn for testing for products, indicative of fuel failure, in the liquid coolant; characterised in that a pump is provided for impelling coolant in the pipes to outlet points in the pipes and that a rotary collector is provided to scan said outlet points with a gap between points and collector across which coolant in the pipes can be impelled.

DESCRIPTION OF THE DRAWING

The invention will now be describe d further with reference to the accompanying drawing which shows diagrammatically in section a pump and mechanical sampling valve arrangement in accordance with the invention.

DESCRIPTION OF THE PREFERRED EMBODIMENT

In the drawing there is shown a number (typically 70) of sodium sampling pipes 10 which pass to the annulus of a multi-duct HALIP (helical annular linear induction pump) 11 from whence they terminate at vertical lengths and discharge via downward pointing outlets 10a and open ends 10b above the outlets 10a into a well 12. The open ends 10b ensure a substantially constant head at outlets 10a. Dipping into the well 12 there is a rotary sampling unit 13 comprising a closed-ended rotary vertical tube 14 inside which there is provided a selector pipe 15 and a further HALIP 16 dipping into the well formed by the closed end of the tube 14. The HALIP 16 discharges via a duct 17 around which there is provided a flowmeter 18. The duct 17 connects with a sample measuring pot 19 having an overflow 20 discharging into the well 12. The selector pipe 15 has a mouth which moves, with a gap 15a, over the outlets 10a of the pipes 10. Sodium level is indicated at 21. An outlet 22 is provided from the well 12 below the sodium level 21. Sodium from this outlet can be monitored for products indicative of fuel failure.

In use the pump 11, which has sodium wetting both the inside and outside of the ducts 10, forces samples of sodium to flow in all pipes 10 and these (except the one being sampled) discharge through both the ends 10b and the ducts and the outlets 10a into well 12 and then pass through outlet 22. The sodium in well 12 is monitored for products which will indicate the failure of a fuel pin and the sodium in pot 19 is monitored for products which will indicate the location of the failed fuel pin according to which sampling duct 10 is impelling coolant into selector pipe 15. The tube 14 may be rotated continuously stepwise or smoothly (eg at 3 revs per hour) or may be held stationary to monitor one specific duct 10 where it is thought that specific observation of the duct is required.

The pump 11 is the subject of our patent application Ser. No. 449,527 claiming priority from GB application No. 82 00561 of Jan. 8, 1982.

We claim:

1. Failed fuel detection apparatus of the kind having liquid coolant sampling pipes which are selected in turn for testing for products, indicative of fuel failure, in the liquid coolant; said apparatus comprising a pump for impelling coolant in the pipes to outlet points in the pipes downstream of said pump, and a rotary collector having an open mouth constructed and arranged to scan said outlet points, and an unsealed gap between said points and said collector mouth for precluding contact thereof, across which gap coolant in the pipes can be impelled by said pump upstream of said points.

2. Apparatus as claimed in claim 1 in which the sampling pipes terminate at vertical lengths with open ends and the outlet points lay below the level of the open ends and are downwardly pointing into a well.

3. Apparatus as claimed in claim 2 in which the well has an outlet for sodium which can be monitored for products indicative of fuel failure.

4. Apparatus as claimed in claim 2 in which the rotary collector is supported in a rotary vertical tube having a closed lower end so that the collector discharges into said tube and the tube has a further pump dipping into the tube and discharging via a duct equipped with a flowmeter and discharging into a sampling pot at which sodium can be monitored for products indicative of fuel failure.

* * * * *